(12) United States Patent
Brunnert et al.

(10) Patent No.: US 8,428,829 B2
(45) Date of Patent: Apr. 23, 2013

(54) SELF-PROPELLED AGRICULTURAL HARVESTING MACHINE WITH CONTROLLABLE TRANSFER DEVICE

(75) Inventors: Andreas Brunnert, Rietberg (DE); Lars Meyer Zu Helligen, Spenge (DE); Gerhard Nienaber, Ennigerloh (DE); Norbert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 741 days.

(21) Appl. No.: 12/045,244

(22) Filed: Mar. 10, 2008

(65) Prior Publication Data
US 2008/0245042 A1 Oct. 9, 2008

(30) Foreign Application Priority Data
Apr. 4, 2007 (DE) .................. 10 2007 016 670

(51) Int. Cl.
*G06F 7/70* (2006.01)
(52) U.S. Cl.
USPC ........................................ 701/50; 56/10.2 F
(58) Field of Classification Search ................. 460/114, 460/115; 56/10.2 F; 701/50
See application file for complete search history.

(56) References Cited

U.S. PATENT DOCUMENTS

| | | | | |
|---|---|---|---|---|
| 5,575,316 A * | 11/1996 | Pollklas | ........................ | 141/198 |
| 5,749,783 A * | 5/1998 | Pollklas | ........................ | 460/119 |
| 6,247,510 B1 * | 6/2001 | Diekhans et al. | ............. | 141/231 |
| 6,587,772 B2 * | 7/2003 | Behnke | ........................... | 701/50 |
| 6,682,416 B2 * | 1/2004 | Behnke et al. | ................ | 460/114 |
| 6,932,554 B2 * | 8/2005 | Isfort et al. | .................... | 414/397 |
| 7,063,614 B2 | 6/2006 | Vogelgesang et al. | | |
| 7,155,888 B2 * | 1/2007 | Diekhans | ................... | 56/10.2 R |
| 7,480,564 B2 * | 1/2009 | Metzler et al. | ................ | 701/207 |
| 7,537,519 B2 * | 5/2009 | Huster et al. | .................. | 460/114 |
| 2009/0044505 A1 * | 2/2009 | Huster et al. | .............. | 56/10.2 R |
| 2011/0066337 A1 * | 3/2011 | Kormann | ........................ | 701/50 |

FOREIGN PATENT DOCUMENTS

| | | |
|---|---|---|
| DE | 100 64 862 | 7/2002 |
| DE | 10 2004 052 298 | 6/2006 |
| EP | 1 454 520 | 9/2004 |

* cited by examiner

*Primary Examiner* — Thomas B Will
*Assistant Examiner* — Joel F. Mitchell
(74) *Attorney, Agent, or Firm* — Michael J. Striker

(57) ABSTRACT

Vehicles, in particular self-propelled agricultural harvesting machines such as forage harvesters or combine harvesters designed to pick up and process crops, include transfer devices that transfer all of the harvested crop material to a hauling vehicle or an attached hauling container. The discharge device is equipped with a control device for performing automatic or manual adjustments, and the self-propelled agricultural harvesting machine is equipped with a navigation system for determining the positions of the vehicles involved. To transfer the crop material to the hauling vehicle without loss, the crop discharge flow is directed only to a defined permissible tolerance region on the hauling container. The tolerance region is located within the hauling container contour and is bounded by edge zones, which are "keep-out" zones for the transfer.

20 Claims, 1 Drawing Sheet

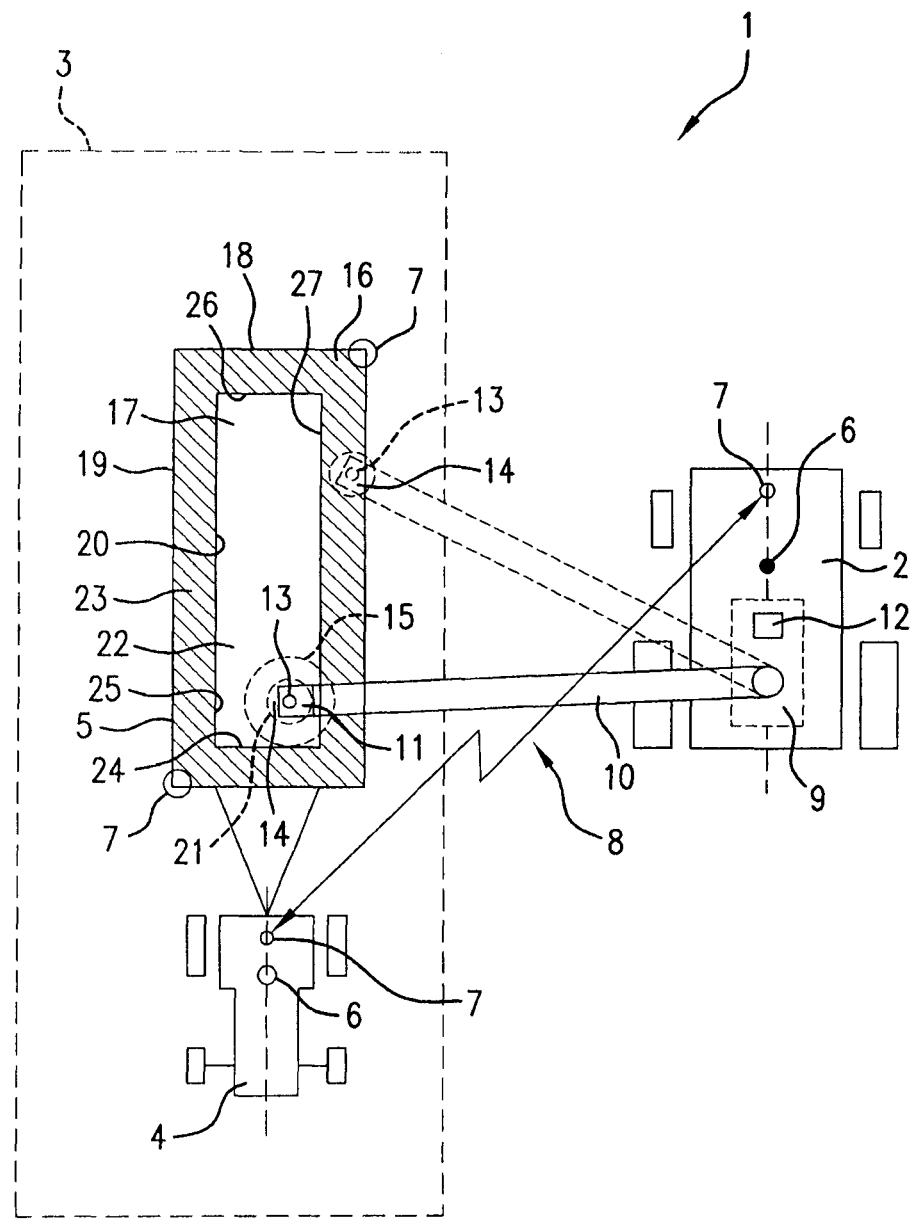

SELF-PROPELLED AGRICULTURAL HARVESTING MACHINE WITH CONTROLLABLE TRANSFER DEVICE

CROSS-REFERENCE TO A RELATED APPLICATION

The invention described and claimed hereinbelow is also described in German Patent Application DE 10 2007 016 670.4 filed on Apr. 4, 2007. This German Patent Application, whose subject matter is incorporated here by reference, provides the basis for a claim of priority of invention under 35 U.S.C. 119(a)-(d).

BACKGROUND OF THE INVENTION

The present invention is based, in general, on the field of agriculture and the processing of harvested crops. Vehicles designed to pick up and process crops—in particular self-propelled agricultural harvesting machines—are used for this purpose. The self-propelled agricultural harvesting machines are typically combine harvesters, forage harvesters, and all types of lifters that are equipped with devices for processing and conveying the crop material. The discharge device is a conveyance device of this type. The discharge device is used to transfer al of the crop material to a hauling vehicle or an attached transport container. During the harvesting operation, the harvesting machines pick up crop material continuously, process it in a known manner, and transfer it to a hauling vehicle that is being driven alongside or behind, the transferring taking place continuously, e.g., with a self-propelled forage harvester, or after intermediate storage, e.g., with a combine harvester. The crop material is transferred using a transfer device, which, on a combine harvester, is a discharge device, for example. With a combine harvester, the discharge device may be a grain tank discharge pipe. With a forage harvester, the discharge device may be an upper discharge chute with a transfer-device cover on the end. A discharge device is used to transfer the crop material from a self-propelled harvesting machine and a hauling vehicle with minimal loss. To this end, the discharge device is equipped with a control device for performing automatic or manual adjustments, and the self-propelled agricultural harvesting machine is equipped with a navigation system for determining the positions of the vehicles involved.

Vehicles of this type, in particular self-propelled agricultural harvesting machines with a transfer device for transferring the crop material to a hauling vehicle or a transport container—the device including a discharge device, a control device for adjusting the discharge device, the transfer-device cover, and the crop discharge flow, and including a navigation system for determining the relative positions of the vehicles involved, and including data transmission between the vehicles—are adequately known from the related art. Various methods for automatically filling hauling vehicles—in the case of a forage harvester—by automatically moving the upper discharge chute are known. One example is described in EP 1 454 520 A1. The aforementioned EP describes a control for positioning a discharge device in accordance with its degrees of freedom, with which the ejection height, i.e., the height at which material is ejected from the discharge device, may be maintained, regardless of the ground level and the rotation around the vertical axis. The disadvantage of this control device is that it does not account for the relative speed and position of the hauling vehicle, for instance. As a result, it is not possible to determine the impact point of the crop material on the hauling vehicle into which the crop material is filled.

To eliminate the disadvantage described above, various methods are described in this context for determining the position of the vehicles involved and their dimensions.

A device of this type for identifying the position and determining the dimensions of self-propelled agricultural vehicles is disclosed in DE 100 64 862 A1. The disclosed object relates to a navigation system installed in the vehicles that ascertains the relative position of the vehicles involved—between which crop material is to be transferred—e.g., a harvesting machine and a hauling vehicle. The data that are determined are used to better coordinate the vehicles with each other. The data are also used to control the discharge device. That is, an adjustment of the discharge device is calculated based on the current position of the harvesting vehicle and the hauling vehicle. In addition, the data that were determined are also used to calculate the theoretical impact point of the crop material on the hauling vehicle based on the dimensions of the transport container and/or the hauling vehicle and the current position of the discharge device. If the impact point of the crop material is outside of the transport container, a warning message is generated.

To further reduce or minimize the loss of crop material during transfer, the impact point of the crop material on the hauling vehicle must be defined and controlled even more exactly.

A control for the discharge device was therefore provided in unexamined patent application DE 10 2004 052 298 A1, which reduces permanent control of the transfer process by the driver and ensures that the crop material is transferred to the hauling vehicle with fewer losses. The goal of this automation is to position a continuous crop discharge flow within a specified geometry. The defined geometry is composed of a virtual grid that encloses a partial region or the entire region of the harvesting vehicle, and therefore also covers the hauling vehicle. The grid is composed of a large number of fields. Using the crop discharge flow control, the driver may guide the crop discharge flow to the controllable fields of the virtual grid when the crop material is transferred from the discharge device.

Overall, the transfer of crop material is oriented to the position and size of the virtual grid, and to the size and position of the fields, so that the range of rotation of the discharge device is determined by the virtual grid and the virtual fields. This disadvantage of this design of the control for the discharge device is that the driver of the self-propelled agricultural harvesting machine must still steer the discharge device and the crop material discharge flow in order to adjust the impact point of the crop material on the transport surface such that the crop material is transferred with fewer losses overall and is not conveyed past the hauling vehicle and left on the field as a loss.

SUMMARY OF THE INVENTION

The object of the present invention, therefore, is to create a control and/or a control system of the type described initially that prevents the aforementioned disadvantages of the designs known from the related art, and to provide a technical solution that makes it possible to support and/or relieve the driver during the transfer process such that the loss of crop material due to poorly coordinated transferring, hard-to-see hauling vehicles, or transferring crop material at night may be prevented.

In keeping with these objects and with others which will become apparent hereinafter, one feature of the present invention resides, briefly stated, in vehicle system, comprising at least two vehicles; a navigation system for determining a relative position of said vehicles; a data transmission system for exchanging data between said vehicles; a transfer device for transferring a harvested crop material to one of said vehicles which is a hauling vehicle, said transfer device including a discharge device, a control device for positioning said discharge device, and a transfer-device cover, configured so that an impact point of a crop discharge flow is located in a tolerance region.

In order to manufacture vehicles with these features of the present invention, in particular self-propelled agricultural harvesting machines that are equipped with a navigation system for determining the relative positions of the vehicles involved, a data transmission system for exchanging data between the vehicles, a transfer device for transferring the harvested crop material to a hauling vehicle, the transfer device including a discharge device, a control device for positioning a discharge device, and a transfer-device cover, it is provided according to the present invention to design the controls known from the related art such that the crop material is transferred to the hauling vehicle and/or its transport container only in a permissible region.

That is, the desired impact point of the crop discharge flow should lie in a permissible region. The tolerance region is bounded by an edge zone. The tolerance region and the edge zone define the surface of the transport container. The surface of the transport container is defined by the transport container contour and/or by the dimensions of the hauling vehicle and/or the transport container. The transport container contour defines the outer boundary of the edge zone. The outer boundary of the edge zone depends on the geometry of the hauling vehicle and/or the transport container, and is therefore adjustable in a variable manner. The dimensions and position of the hauling vehicle/transport container may be determined using sensors, e.g., using a navigation system with GPS antennas on the transport container, and/or using a combination of sensors and a mathematical model. The inner boundary of the edge zone, however, is located within the boundary of the surface of the transport container and is part of the loading surface. In a special case, the inner boundary of the edge zone may coincide with the outer boundary of the edge zone, either partially or entirely.

That is, the size of the tolerance region for the impact point of the crop discharge flow may also be adjusted during the transfer process via the variably adjustable, inner boundary of the edge zone. The size of the tolerance region is adjusted based on the need and/or harvesting conditions. The need to make an adjustment therefore depends on various parameters, e.g., the machine and crop material-dependent parameters, by way of which the location of the edge zone—that is, the inner and/or outer boundaries of the edge zone—may be changed.

When crop material-dependent parameters are changed, it is therefore possible to change the position of the inner boundary of the edge zone. Crop material-dependent parameters are, e.g., the heaped cone of the conveyed crop material, the size of which may vary due to the different levels of moisture in the crop material. Dried crop material results in a small heaped cone, while moist crop material results in a large heaped cone. When the size of the heaped cone changes, the position of the inner boundary of the edge zone and, therefore, the size of the tolerance range for the impact point of the crop discharge flow should be varied. The type and/or length of cut of the crop material also affect the heaped cone.

Changes to the machine-dependent parameters may also result in the inner boundary of the edge zone being changed. Machine-dependent parameters are, e.g., the ground speed of the harvesting machine and/or the hauling vehicle, and the speed of the vehicles relative to each other, by way of which the inner boundary of the edge zone may be changed during the transfer process and adapted to the new circumstances. A further machine-dependent parameter accounts for the diagonal position of the harvesting and hauling vehicle, i.e., the slant of the field or the slant of the hauling vehicle and/or the harvesting machine relative to the ground. These parameters are also considered in the evaluation for the control when determining the inner boundary of the edge zone. Parameters of sensors that register the ambient conditions may also be considered in the evaluation for the control of the discharge device. Parameters of ambient conditions are, e.g., wind direction and wind speed.

The surface formed between the inner and outer boundaries of the edge zone is a "keep-out" zone for the impact point of the crop discharge flow. Crop material must not land in these "keep-out" zones. With regard for transferring crop material, the "keep-out" zone is a safety zone at the edge of the transport container, which may be increased or reduced in size as needed. The theoretical impact point of the crop discharge flow on the hauling vehicle or the transport container is determined using the method described in the related art per DE 100 64 862 A1 and DE 10 2004 052 298 A1. The position of the impact point that was identified is used to determine whether a transfer process may start or not. If the theoretically determined impact point of the crop discharge flow is located in the region of the "keep-out" zone, the transfer process is not started.

The conveyance of crop material in an on-going transfer process is interrupted until the theoretical impact point of the crop material is once more located in the tolerance region of the loading zone. If the theoretical impact point of the crop discharge flow is located in the tolerance region of the loading zone, the discharge device is switched on and the transfer process is started. That is, the transfer process is automatically started and/or carried out only in the permitted region of the crop material impact point. If the impact point of the crop discharge flow leaves the permissible region, the transfer process is automatically switched off, and the driver of the harvesting machine and the hauling vehicle is informed via a warning signal. The driver of the harvesting machine now has the option of continuing the transfer process by controlling the discharge device manually.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a schematic depiction of vehicles involved during the harvesting and transfer process; one vehicle is a harvesting machine, and the other vehicle is a hauling vehicle used for harvesting operations and includes the transfer region described according to the present invention.

DESCRIPTION OF THE PREFERRED EMBODIMENTS

FIG. 1 is a schematic depiction of two vehicles 1 driving next to each other in parallel, in a top view. One of the vehicles is a self-propelled harvesting machine 2 in the form of a combine harvester with known elements, e.g., crop material pick-up device, driver's cab, grain tank, ground drive, land wheels, etc., which will not be discussed in greater detail here, and a hauling vehicle 3, which is composed of a pulling machine 4 and an attachable transport container 5. A hauling vehicle 3 may also be composed of a pulling machine 4 with integrated transport container 5, a semi-trailer, e.g., a truck.

Self-propelled harvesting machine 2 may also be, e.g., a forage harvester. Using the crop material pick-up device, the forage harvester picks up crop material from the field being worked, fragmentizes the crop material and transfers it using transfer device 9 to hauling vehicle 3 or transport container 5. Transfer device 9 is composed of a control device 12, a discharge device 10, and a transfer-cover device 11 for the continuous transfer of the crop material.

Combine harvester 2 also picks up crop material form the field being worked using the crop material pick-up device, fragmentizes and separates the crop material, ejects the straw portions and stores the grain portions in a grain tank. The combine harvester also includes a transfer device 9, which empties the grain tank. The crop material is transferred from the grain tank to hauling vehicle 3 and/or transport container 5 using a discharge device 10 and a transfer-device cover 11. The crop material may be transferred and the grain tank may be emptied in a continuous or discontinuous manner during the harvesting operation. When crop material is picked up in a continuous manner, in particular, it is necessary to not expect the driver to perform other duties as well, to ensure that he may focus fully on picking up the crop material.

The manner in which the driver is relieved of duties, according to the present invention, is based on the fact that crop material may be transferred in a fully automated manner. To ensure that transfer may be carried out in a fully automated manner, the current positions of vehicles 1 involved, harvesting machine 2, and hauling vehicle 3 must be determined using a navigation system 6. Self-propelled harvesting machine 2 and hauling vehicle 3—and its transport container 5—are therefore equipped with GPS antennas 7. Navigation system 6 is necessary to ensure coordination between vehicles 2, 3, to register the dimensions of hauling vehicle 3 and transport container 5, and to supply this specific information on hauling vehicle 3 and/or transport container 5 to a data memory (not shown). These special data are used for exact control 12 of discharge device 10. Based on the sum of the data determined—which are composed of different machine and crop material parameters—theoretical impact point 13 of crop discharge flow 14 onto transport container 5 is calculated, and it is used to control discharge device 10 and transfer-device cover 11.

To further reduce the crop material losses incurred when the crop material is transferred, it is provided according to the present invention to define a tolerance region 15 for impact point 13 of crop discharge flow 14 that is located within the boundary of loading surface 17. Loading surface 17 is defined by the contour of transport container 5. To reduce the crop material losses, crop material flow 14 should not be directed up to the contour of transport container 5. Instead, a certain distance therefrom should be maintained. The distance should be adjustable in a variable manner based on the different machine and crop material-dependent parameters. In order to maintain a defined distance from transport container contour 18 for impact point 13 of crop discharge flow 14, an edge zone 16 is formed around transport container contour 18, which represents a "keep-out" zone 23 for impact point 13 of crop discharge flow 14. Edge zone 16 is defined by outer boundary 19 and inner boundary 20. Outer boundary 19 of edge zone 16 is defined by transport container contour 18. Inner boundary 20 of edge zone 16 defines tolerance range 15 for theoretical loading zone 22. Loading zone 22 and edge zone 16 together represent loading surface 17.

As indicated above, inner boundary 20 of edge zone 16 may be changed during the harvesting operation and during transfer, and may therefore be adapted to the harvesting conditions. In the current example shown in FIG. 1, inner boundary 20 of edge zone 16 is formed by four inner boundary lines 24, 25, 26, 27. Two sets of boundary lines 24, 26 and 25, 27 are separated but parallel, and they are defined by transport container contour 18. Other geometric transport container contours 18 result in other geometric inner boundary lines. When inner boundary 20 of edge zone is changed, all four boundary lines 24, 25, 26, 27 may be affected.

It is also possible to change every individual boundary line based on the machine and crop material-dependent parameters. For example, all four boundary lines 24, 25, 26, 27 are changed when the diameter of heaped cone 21 is changed, or two boundary lines 25, 27 are changed with the slant of transport container 5 when it is located at a slant relative to the ground. A further exemplary change to inner boundary lines 24, 26 may result from taking wind conditions into account. It is also possible to change only one of the four boundary lines. Whenever the inner boundary lines 24, 25, 26, 27 are changed, tolerance region 15 for impact point 13 of crop discharge flow 14 changes, and, therefore, so does theoretical loading zone 22.

This theoretical loading zone 22 is controlled by discharge device 10. With a combine harvester, discharge device 10 may be a grain tank discharge tube. With a forage harvester, discharge device 10 may be an upper discharge chute. Crop material may be transferred from harvesting machine 2 to a hauling vehicle 3 in a continuous or discontinuous manner. A further connection exists between harvesting machine 2 and hauling vehicle 3, i.e., a transmission system 8. Transmission system 8 provides a data transmission path. Using this data transmission path, data for coordinating the vehicles and for controlling discharge device 10 may be exchanged.

It will be understood that each of the elements described above, or two or more together, may also find a useful application in other types of constructions differing from the type described above.

While the invention has been illustrated and described as embodied in a self-propelled agricultural harvesting machine with controllable transfer device, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:
1. A vehicle system, comprising
at least two vehicles;
a navigation system for determining a relative position of said vehicles;
a data transmission system for exchanging data between said vehicles;
a transfer device for transferring a harvested crop material to one of said vehicles which is a hauling vehicle, said transfer device including a discharge device, a control device for positioning said discharge device, and a transfer-device cover; and a transport container having an edge zone bounded by inner and outer boundaries of said transport container, which inner and outer boundaries are spaced from one another in a horizontal direction, and representing a "keep-out" zone, and a tolerance region located inside said inner boundary, as considered in a horizontal direction, and spaced horizontally from said "keep-out" zone, wherein said control device is configured to position said discharge device in the horizontal direction for avoiding entering of the "keep-out" zone by a crop discharge flow and for locating an impact point of the crop discharge flow in the tolerance region.

2. A vehicle system as defined in claim 1, wherein said transport container is configured so that a surface of said transport container is defined by a transport contour.

3. A vehicle system as defined in claim 2, wherein said transport container is configured so that said transport container contour defines the outer boundary of the edge zone.

4. A vehicle system as defined in claim 3; and further comprising means for adjusting the outer boundary in a variable manner.

5. A vehicle system as defined in claim 1, and further comprising means for adjusting a size of the tolerance region for the impact point of the crop discharge flow, using the inner boundary of the edge zone, which inner boundary is variably adjustable.

6. A vehicle system as defined in claim 1, and further comprising means for changing setting of the edge zone when machine or crop material-dependent parameters change.

7. A vehicle system as defined in claim 1; and further comprising means for making a theoretically determined position of the impact point decisive factor for starting a transfer process.

8. A vehicle system as defined in claim 1; and further comprising means for starting a transfer process configured so that the transfer process is started when the impact point of the crop discharge flow is located in the tolerance region.

9. A vehicle system as defined in claim 1; and further comprising means for halting a transfer process when the impact point of the crop discharge flow leaves the tolerance region.

10. A vehicle system as defined in claim 1, wherein one of said vehicles is a combine harvester on which the discharge device is configured as a grain tank discharge pipe.

11. A vehicle system as defined in claim 1, wherein one of said vehicles is a forage harvester in which said discharge device is an upper discharge chute.

12. A vehicle system as defined in claim 1, wherein said transfer device is configured so that the crop material is transferred from one of said vehicles which is a harvesting machine to said hauling vehicle in a manner selected from the group consisting of in a continuous manner and in a discontinuous manner.

13. A vehicle system, comprising at least two vehicles;

a navigation system for determining a relative position of said vehicles;

a data transmission system for exchanging data between said vehicles;

a transfer device for transferring a harvested crop material to one of said vehicles which is a hauling vehicle, said transfer device including a discharge device, a control device for positioning said discharge device, and a transfer-device cover;

a transport container having an edge zone bounded by inner and outer boundaries of said transport container, which inner and outer boundaries are spaced from one another in a horizontal direction, and representing a "keep-out" zone, and a tolerance region located inside said inner boundary, as considered in the horizontal direction, and spaced horizontally from said "keep-out" zone, wherein said control device is configured to position said discharge device in the horizontal direction for avoiding entering of the "keep-out" zone by a crop discharge flow and for locating an impact point of the crop discharge flow in the tolerance region, and wherein said transport container is configured so that a surface of said transport container is defined by a transport contour and said transport container contour defines said outer boundary of the edge zone, and wherein said inner boundary of the edge zone is located within a boundary of a receiving surface as considered in the horizontal direction.

14. A vehicle system as defined in claim 13, wherein said inner boundary coincides, particularly or entirely, with said outer boundary of the edge zone.

15. A vehicle system as defined in claim 13; and further comprising means for changing a position of the inner boundary of the edge zone when crop-material parameters change.

16. A vehicle system as defined in claim 13; and further comprising means for changing the inner boundary of the edge zone when the edge zone changes.

17. A vehicle system as defined in claim 13; and further comprising means for changing the inner boundary of the edge zone when machine-dependent parameters change.

18. A vehicle system as defined in claim 13; and further comprising means for changing the inner boundary of the edge zone when a relative speed changes.

19. A vehicle system as defined in claim 13; and further comprising means for defining the inner boundary of the edge zone by four boundary lines.

20. A vehicle system, comprising at least two vehicles;

a navigation system for determining a relative position of said vehicles;

a data transmission system for exchanging data between said vehicles;

a transfer device for transferring a harvested crop material to one of said vehicles which is a hauling vehicle, said transfer device including a discharge device, a control device for positioning said discharge device, and a transfer-device cover; and a transport container having an edge zone bounded by inner and outer boundaries of said transport container, which inner and outer boundaries are spaced from one another in a horizontal direction, and representing a "keep-out" zone, and a tolerance region located inside said inner boundary, as considered in the horizontal direction, and spaced horizontally from said "keep-out" zone, wherein said control device is configured to position said discharge device for avoiding entering of the "keep-out" zone by a crop discharge flow and for locating an impact point of the crop discharge flow in the tolerance region, and wherein the transport container has side walls forming said outer boundary, while said inner boundary is formed by an inner edge zone situated in a certain distance in the horizontal direction from said outer boundary.

* * * * *